July 2, 1963 F. P. WARRICK 3,095,778
FILM DRIVING MEANS IN A HIGH-SPEED CAMERA
Filed May 18, 1959 2 Sheets-Sheet 1
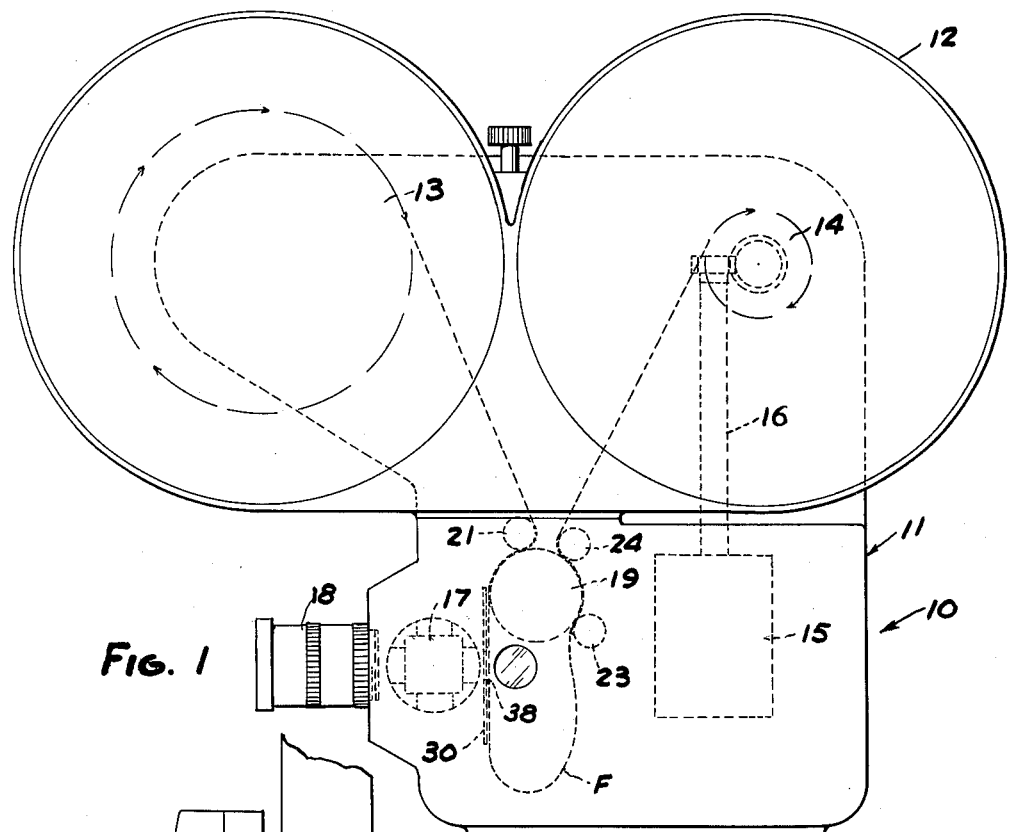
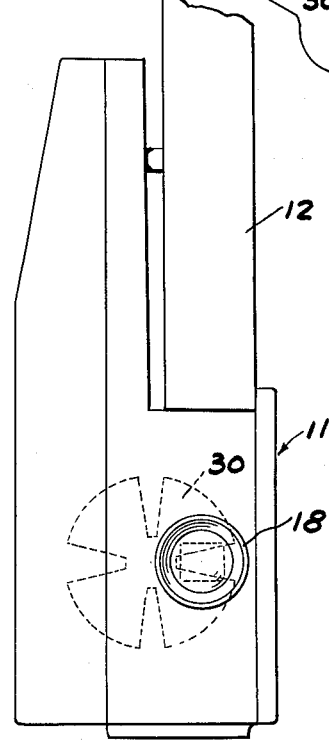
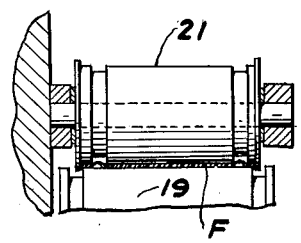
INVENTOR.
FREDERICK P. WARRICK
BY
Barnes, Kisselle, Raisch & Choate
ATTORNEYS

United States Patent Office 3,095,778
Patented July 2, 1963

3,095,778
FILM DRIVING MEANS IN A HIGH-SPEED CAMERA
Frederick P. Warrick, 8565 Thendara, Clarkston, Mich.
Filed May 18, 1959, Ser. No. 813,818
7 Claims. (Cl. 88—17)

This invention relates to high-speed photographic cameras and particularly to cameras which are intended to make a succession of photographs of rapidly moving objects such as aircraft, missiles, and the like.

In photographing fast-moving objects such as jet aircraft and guided missiles, it has become necessary to use cameras wherein the film is moved continuously, as distinguished from intermittently, through the camera past a photographic lens because of the extremely high speed of the objects. The individual frames or exposures are obtained by positioning a polygonal prism between the lens and the film with the axis of the prism perpendicular to the axis of the camera lens and parallel to the plane of the film at the exposure area. In such cameras the film is usually pulled past the aperture by a sprocket which is driven from a motor. In addition, means is provided for rewinding the film on a rewind reel.

Such cameras have proved quite successful especially when they embody the invention disclosed and claimed in my copending application, titled "High-Speed Camera," Serial No. 627,012, filed December 7, 1956, now Patent No. 2,952,183, issued September 13, 1960. However, a problem has been encountered because of the apparent shifting of the images formed on the film. Specifically, when a strip of film exposed in such high-speed cameras is projected, the images sometimes appear to shift vertically on the screen even though there has been no such vertical movement of the object being photographed. Such a vertical shifting during projection not only is disturbing to the viewer but makes it difficult to compare one image with another as is necessary in analyzing the flight of objects such as jet aircraft or guided missiles.

One theory as to the reason for the apparent shifting of the image is that it is due to the change in length of the film which occurs because of temperature variation or when the film is exposed to air. The change in length of the film causes a change in pitch length, that is, the distance between the perforations of the film. Normally, the length of the film decreases from the length at original manufacture. In high-speed cameras of conventional construction, the film is pulled from a supply reel by a sprocket over which it is trained. In some cameras, the sprocket is of large diameter and forms the plane of the aperture against which the images from the camera lens are directed. In other cameras, the sprocket pulls the film past the camera aperture. In both types of cameras, the film tightly hugs the sprocket throughout a major portion of the circumference of the sprocket. Because of the aforementioned variation in pitch length of the film, the perforations in the film do not always register accurately with the teeth of the sprocket. Specifically, let us assume that a length of film has its perforations in engagement with a plurality of teeth of a sprocket and the sprocket is driving the film, that is, pulling the film under tension with the leading edge of the first tooth in engagement with the leading edge of the first perforation and with the trailing edge of the last tooth in engagement with the trailing edge of the last perforation, then as the sprocket rotates, the first tooth of the series will move out of engagement with the first perforation. Theoretically, successive teeth will move into engagement with successive perforations, that is, the leading edge of the successive teeth will successively engage the leading edge of successive perforations driving and pulling the film across the aperture. In order to accomplish this, it will be necessary for the film to move relative to the sprocket in order to bring the leading edge of each successive tooth into engagement with the leading edge of each successive perforation because as indicated above, the pitch length of the film under the conditions assumed is less then the spacing between successive teeth on the sprocket. In practice, this slight shifting of the film relative to the sprocket does not occur each time a tooth on the sprocket moves out of engagement with a perforation on the film because of the friction that exists between the film and the body of the sprocket due to the tension on the film. This friction tends to prevent relative movement between the sprocket and the film. As a result, the sprocket may not move relative to the film in a uniform manner in order to bring the leading edges of the successive teeth into engagement with the leading edges of successive perforations. The variation between the tooth spacing of the sprocket and the spacing between the perforations on the film may accumulate until at some indeterminate moment the sprocket may suddenly move or slip relative to the film to bring the leading edges of the teeth into engagement with the leading edges of the perforations. In such a case, there is a sudden and erratic interruption or lag in the movement of the film. This friction between the film and the sprocket is commonly termed a "belting" effect.

While the above explanation is based on theory, nevertheless, I have devised a novel feed mechanism for the film which eliminates the sudden and erratic interruption or lag referred to and substantiates the correctness of this theory. The novel film feed mechanism of this invention eliminates substantially entirely the possibility of the film shifting suddenly and erratically relative to the feed sprocket of the camera during exposure with the result that when the film is projected there is no apparent shifting of the image.

FIG. 1 is a side elevation of a camera embodying this invention, with some parts shown in broken lines.

FIG. 2 is a fragmentary front elevation of the camera embodying the invention.

FIG. 4 is a fragmentary sectional view taken along the line 4—4 in FIG. 3.

Figure 3:
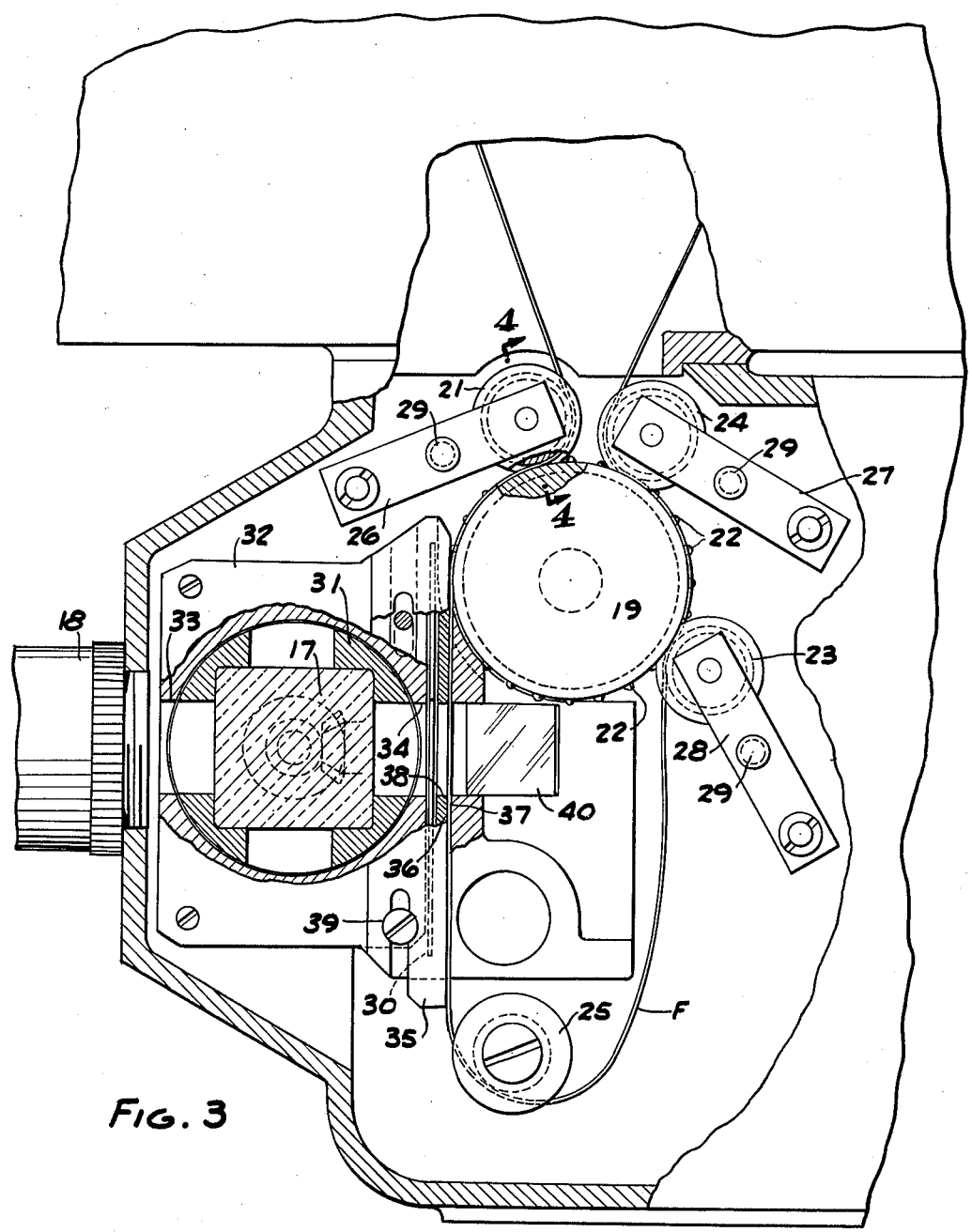
FIG. 3 is a fragmentary, part sectional view on an enlarged scale of a portion of the camera shown in FIG. 1.

Referring to FIG. 1, camera 10 comprises a housing 11 on which a reel magazine 12 is removably mounted. Reel magazine 12 has rotatively mounted therein a supply reel 13 for unexposed photographic film and a take-up reel 14 for the exposed film. Take-up reel 14 is driven by an electric motor 15 mounted in housing 11 and having a driving connection generally designated 16 with take-up reel 14.

As shown in FIG. 1, the film F is unwound from supply reel 13 and is fed downwardly past a rotating prism 17 in a generally flat vertical plane. Prism 17 is aligned with the axis of a lens 18. The film then passes upwardly to the take-up reel 14.

The film is driven in said vertical plane past the prism 17 and lens 18 by a sprocket 19 rotatably mounted on the camera generally above the axis of lens 18.

As shown in FIGS. 3 and 4, the film from supply reel 13 passes between an idler roller 21 on the camera and sprocket 19. Idler roller 21 holds the film in position to be engaged by the teeth on sprocket 19 at a relatively small area, so that the tension on the film between the supply reel 13 and the sprocket 19 is prevented from being transmitted to the portion of the film which is fed downwardly past aperture 38. The arrangement of the idler roller 21, sprocket 19 and aperture 38 is such that a minimum number of teeth of the sprocket are in register with the perforations. Stated differently, idler roller 21 is located circumferentially relatively close to the vertical plane of the film aperture 38. In the embodiment illustrated roller 21 is spaced less than 90° from the plane of the film aperture. As shown, about seven and preferably less than ten sprocket teeth are in register with the perforations in the film between the idler roller 21 and the aperture 38. The film then forms a loop and passes upwardly between sprocket 19 and two idler rollers 23, 24 on the camera. Idler rollers 23, 24 hold the film in engagement with the teeth on sprocket 19 so that any tension on the portion of the film between the take-up reel 14 and the sprocket 19 is prevented from being transmitted to the loop which extends between idler rollers 21 and 23.

Each idler roller 21, 23, 24 is rotatably mounted on a lever 26, 27, 28, respectively, pivoted to the camera housing. A lock pin 29 on each lever engages an opening in the camera housing for locking the lever in a position wherein the idler roller is adjacent the periphery of the sprocket 19. Pins 29 may be retracted to enable swinging the idler rollers outwardly away from the periphery of sprocket 19 to thread the film through the camera. A guide roller 25 positioned below the aperture 22 facilitates the formation of the loop when the film is first threaded through the camera. The loop of film passes loosely over the guide roller 25 during the operation of the camera.

As shown in FIG. 2, a shutter 30 may be provided adjacent the aperture. Shutter 30 is mounted for rotation about an axis parallel to the axis of the lens 18. Shutter 30 and prism 17 are driven from the electric motor 15 by means not shown. The shutter operates to provide a distinct image as more fully described in my aforementioned application, Serial No. 627,012.

The remaining structure of the camera shown in FIG. 3, including the means for guiding the film past the camera aperture in a flat plane, is of conventional construction as shown in my aforementioned patent application. This means comprises a rotatable cage 31 for supporting prism 17 and a prism housing 32 mounted on a housing 11 of the camera. Housing 32 includes apertures 33, 34 which are aligned with the axis of lens 18. A vertically shiftable guide member 35 held in position by screws 39 is provided adjacent one surface of prism housing 32 and is shiftable upwardly to permit easy threading of the film between the sprocket 19 and guide member 35. Guide member 35 includes a guiding surface 36 which co-operates with surface 37 to guide the film past aperture 38 in guide member 35 which is aligned with apertures 33, 34 in the prism housing 32 when member 35 is in operative position. A focusing prism 40 is provided adjacent aperture 38.

It should be understood that the specific arrangement of the film plane, prism structure and shutter structure are not a part of this invention. In the camera described, the motor 15 operates the prism 17, shutter 30 and take-up reel 14, the sprocket 19 thus being rotated by the film being wound up on the take-up reel 14. It should be understood that a direct drive may be provided to sprocket 19.

In operation, the rotation of the take-up reel 14 rotates the sprocket 19 to feed film downwardly past the aperture 38. At the same time, prism 17 is rotated about its axis at a speed which is synchronized with a downward movement of the film to cause successive images to be directed from the camera lens toward the aperture 38 and to move in the direction of movement of the film. The shutter 30, if present, is also rotated about its axis so that the shutter opening is successively moved past the exposure area to successively expose portions of the film.

Although the film is pulled from the supply reel 13 by rotation of the sprocket 19, there is no tension on the free loop of film which extends between the idler roller 21 and the idler roller 23. Thus, there is no tension on the film moving past the aperture. Although the take-up reel 14 is winding up the film so that the film drives the sprocket 19, none of the tension on the film is transmitted to the free loop between the idler rollers 21 and 23. Since the sprocket is always pushing or driving the free loop of film between idler rollers 21 and 23, the driving teeth of the sprocket, that it, those which first engage the film, always engage the forward edge of the perforations. This combined with the fact that there is no tension on the film so that there is no tendency of the film to hug the sprocket prevents any belting effect, that is, eliminates any tendency for the film to bind against the sprocket and erratically and suddenly shift relative to the sprocket.

I have found that in order to accommodate changes in the length of the film between successive teeth caused by temperature variation, the pitch of the teeth on the sprocket should preferably be less than the standard pitch of the perforations of the film. Thus, if the film shrinks on being exposed to room temperature, the sprocket pitch is still adequate to cause successive engagement with the perforations to drive the film past the aperture.

The camera made in accordance with my invention permits the photographing of a rapid succession of positions of rapidly moving objects such as aircraft and missiles without any apparent vertical shifting of the image when the film is projected. Thus, it is possible to analyze the images on the film and be certain that the film has accurately recorded the travel of the object which has been photographed.

I have found that by using a film drive mechanism in accordance with my invention, the apparent vertical displacement of a projected image is entirely eliminated. As a result, it is possible to view images of fast-moving objects and analyze the action thereof without any danger that the image moving vertically due to variations in tension on the film or slippage of the film that may have occurred in the camera when the film was exposed.

I claim:

1. In a high-speed camera wherein images are successively directed toward an aperture and moved in the direction of movement of the film across the aperture, the combination comprising means forming an aperture which defines an exposure area, sprocket means rotatably mounted at a point spaced from and in advance of the axis of said aperture, the plane containing the aperture being substantially tangent to the sprocket means, means for continuously rotating said sprocket means at a substantially uniform speed, said sprocket means having teeth on the periphery thereof adapted to engage perforations in the film, means adjacent one point of the periphery of said sprocket means for holding film in position to be engaged by the teeth of said sprocket means, means adjacent another point on the periphery of said sprocket means for holding a portion of the film in position to be engaged by the teeth of said sprocket means, means for guiding said film from adjacent the periphery of said sprocket means and across said aperture, thereby permitting a loop of film in untensioned state to be provided between said first and second means, said aperture being positioned in such a manner that a portion of said untensioned loop is adjacent thereto so that when the sprocket means is continuously rotated, the film is moved continuously across said aperture in an untensioned state.

2. The combination set forth in claim 1 wherein said guide means comprises a flat film guide which is substantially co-planar with said aperture and extends into adjacent and substantially tangent relation to said sprocket.

3. In a high-speed camera, the combination comprising means forming an aperture which defines an exposure area, a film driving sprocket spaced from and in advance of the axis of said aperture, the plane containing the aperture being substantially tangent to the sprocket, means for continuously rotating said sprocket at a substantially uniform speed, a first idler roller in contact with said sprocket, a second idler roller in contact with said sprocket at a point spaced circumferentially from the first roller and means for guiding said film from adjacent the periphery of said sprocket and across said aperture, whereby a strip of film may be threaded between said first idler roller and said sprocket past said aperture area and between said second idler roller and said sprocket whereby said length of film between said first idler roller and second idler roller is free and untensioned so that when the sprocket is continuously rotated, the film is moved continuously across said aperture in an untensioned state.

4. The combination set forth in claim 3 wherein the axis of said first idler roller is displaced from the plane containing said aperture a distance less than the radius of said sprocket.

5. In a high-speed camera wherein images are successively directed toward an aperture and moved in the direction of movement of the film across the aperture, the combination comprising means for rotatably supporting a supply reel for film, means for rotatably supporting a take-up reel for film, means forming an aperture which defines an exposure area, a sprocket rotatably mounted at a point spaced from and in advance of said exposure area, the plane containing the aperture being substantially tangent to the sprocket, said sprocket having teeth on the periphery thereof adapted to engage perforations in the film, means for continuously rotating said sprocket at a substantially uniform speed, a first idler roller adjacent the periphery of said sprocket, a second idler roller spaced from said first roller adjacent the periphery of said sprocket and means for guiding said film from adjacent the periphery of said sprocket and across said aperture, whereby film from said supply reel may be first threaded between said first idler roller and said sprocket past said aperture and thereafter threaded between said second idler roller and said sprocket to said take-up reel so that when the sprocket is rotated a free and untensioned loop of film between said rollers is moved past said aperture.

6. The combination set forth in claim 5 including a third idler roller adjacent the periphery of said sprocket and spaced from said first and second rollers, said film being threaded between said third idler roller and said sprocket after passing past said aperture in an untensioned state.

7. In a high-speed camera wherein images are successively directed toward an aperture and moved in the direction of movement of the film across the aperture, the combination comprising means forming an aperture which defines an exposure area, means for continuously and uninterruptedly producing successive images at the exposure area, a film driving sprocket spaced from and in advance of the axis of said aperture, means for continuously rotating said sprocket at a substantially uniform speed, the plane containing the aperture being substantially tangent to the sprocket, means defining a flat film guide substantially co-planar with said aperture and extending from said aperture adjacent to and in substantially tangent relation to said sprocket, a first idler roller in contact with said sprocket, a second idler roller in contact with said sprocket at a point spaced circumferentially from the first roller whereby a strip of film may be threaded between said first idler roller and said sprocket through said flat film guide past said aperture area and between said second idler roller and said sprocket whereby said length of film between said first idler roller and second idler roller is free and untensioned so that when the sprocket is continuously rotated, the film is moved continuously across said aperture in an untensioned state.

References Cited in the file of this patent

UNITED STATES PATENTS

| | | |
|---|---|---|
| 1,287,503 | Stechbart | Dec. 10, 1918 |
| 1,803,579 | Goldhammer | May 19, 1931 |
| 2,463,016 | Briskin et al. | Mar. 1, 1949 |
| 2,499,947 | Collins | Mar. 7, 1950 |
| 2,831,391 | Culver | Apr. 22, 1958 |
| 2,906,162 | Taylor | Sept. 29, 1959 |

FOREIGN PATENTS

| | | |
|---|---|---|
| 344,958 | Germany | Dec. 2, 1921 |
| 588,841 | Great Britain | June 4, 1947 |